United States Patent [19]

Bivens et al.

[11] Patent Number: 5,284,596
[45] Date of Patent: Feb. 8, 1994

[54] SUBSTANTIALLY CONSTANT BOILING COMPOSITIONS OF 1,1,1,2-TETRA-FLUOROETHANE AND DIMETHYL ETHER

[75] Inventors: Donald B. Bivens, Kennett Square, Pa.; Akimichi Yokozeki, Greenville, Del.

[73] Assignee: E. I. Du Pont de Nemours and Company, Wilmington, Del.

[21] Appl. No.: 798,607

[22] Filed: Nov. 26, 1991

Related U.S. Application Data

[63] Continuation-in-part of Ser. No. 492,963, Mar. 12, 1990, abandoned.

[51] Int. Cl.$^5$ .................. C09K 5/04; C09K 3/30; C08J 9/14
[52] U.S. Cl. .................. 252/67; 60/651; 62/114; 252/305; 252/571; 252/DIG. 9; 264/53; 264/DIG. 5; 521/98; 521/131
[58] Field of Search ........ 252/67, 69, 162, 170, 252/171, 172, 305, 364, DIG. 9, 571; 62/114; 264/53, DIG. 5; 521/98, 131; 60/651

[56] References Cited

U.S. PATENT DOCUMENTS

| | | | |
|---|---|---|---|
| 2,885,427 | 5/1959 | Ruh et al. | 570/168 |
| 3,607,755 | 9/1971 | Murphy | 252/67 |
| 3,922,228 | 11/1975 | Hutchinson | 252/67 |
| 4,002,573 | 1/1977 | Hutchinson | 252/171 |
| 4,062,795 | 12/1977 | Hutchinson | 252/171 |
| 4,129,603 | 12/1978 | Bell | 570/169 |
| 4,226,976 | 10/1980 | Goodman | 528/498 |
| 4,428,854 | 1/1984 | Enjo et al. | 252/69 |
| 4,482,465 | 11/1984 | Gray | 252/67 |
| 4,543,202 | 9/1985 | Bartlett et al. | 252/306 |
| 4,585,577 | 4/1986 | Bartlett et al. | 252/305 |
| 4,595,522 | 6/1986 | Bartlett et al. | 252/305 |
| 4,755,316 | 7/1988 | Magid et al. | 252/68 |
| 4,771,080 | 9/1988 | Ibuki et al. | 521/56 |
| 4,783,276 | 11/1988 | Bohnenn | 252/64 |
| 4,810,316 | 3/1989 | Wakabayashi et al. | 156/78 |
| 4,975,212 | 12/1990 | Thomas et al. | 252/54 |
| 5,182,040 | 1/1993 | Bartlett et al. | 252/67 |
| 5,188,748 | 2/1993 | Arnaud et al. | 252/67 |

FOREIGN PATENT DOCUMENTS

| | | |
|---|---|---|
| 30127 | 6/1981 | European Pat. Off. . |
| 2737132 | 2/1978 | Fed. Rep. of Germany . |
| 2658508 | 8/1991 | France . |
| 3077821 | 4/1991 | Japan . |
| 91/13968 | 9/1991 | World Int. Prop. O. . |

OTHER PUBLICATIONS

WPI Acc. No. 78-29937A, Abstract of RD 168041 Apr. 1978.
Chemical Abstracts vol. 87, No. 25, 1977 Abstract No. 200710q.
"Technical Progress on Protecting the Ozone Layer-Refrigeration, Air Conditioning and Heat Pumps" *Technical Options Report* May 1989 pp. 34-36.
L. Bohnenn "Update and Review of DME Propellant 1986" *Aerosol Report* vol. 25 No. 3 1986.
DuPont Dymel © Product Literature.
Chemical Abstract No. 116(16):154439a; abstract of Lee et al Ind. Eng. Chem. Res., 31(4) pp. 1212-1216 1992.

*Primary Examiner*—Linda Skaling
*Attorney, Agent, or Firm*—James J. Flynn; Michael K. Boyer

[57] ABSTRACT

Substantially constant boiling compositions of 1,1,1,2-tetrafluoroethane and dimethyl ether and its use as a refrigerant, aerosol propellant and polymer foam blowing agent are disclosed.

5 Claims, No Drawings

SUBSTANTIALLY CONSTANT BOILING COMPOSITIONS OF 1,1,1,2-TETRA-FLUOROETHANE AND DIMETHYL ETHER

CROSS-REFERENCE TO RELATED APPLICATION

This application is a continuation-in-part of application Ser. No. 07/492,963, filed Mar. 12, 1990 now abandoned.

BACKGROUND OF THE INVENTION

This invention relates to mixtures of 1,1,1,2-tetrafluoroethane (HFC-134a) and dimethyl ether (DME). Such mixtures are useful as refrigerants, heat transfer media, gaseous dielectrics, foam expansion agents, aerosol propellants and power cycle working fluids. These mixtures are potentially environmentally safe substitutes for dichlorodifluoromethane (CFC-12), which is a large volume commercial refrigerant.

Closed-cell polyurethane foams are widely used for insulation purposes in building construction and in the manufacture of energy efficient electrical appliances. In the construction industry, polyurethane (polyisocyanurate) board stock is used in roofing and siding for its insulation and load-carrying capabilities. Poured and sprayed polyurethane foams are widely used for insulating large structures such as storage tanks, etc. Pour-in-place polyurethane foams are used, for example, in appliances such as refrigerators and freezers plus they are used in making refrigerated trucks and railcars.

All of these various types of polyurethane foams require expansion agents (blowing agents) for their manufacture. Insulating foams depend on the use of halocarbon blowing agents, not only to foam the polymer, but primarily for their low vapor thermal conductivity, a very important characteristics for insulation value. Historically, polyurethane foams are made with CFC-11 ($CFCl_3$) as the primary blowing agent.

A second important type of insulating foam is phenolic foam. These foams, which have very attractive flammability characteristics, are generally made with CFC-11 and CFC-113 (1,1,2-trichloro-1,2,2-trifluoroethane) blowing agents.

A third type of insulating foam is thermoplastic foam, primarily polystyrene foam. Polyolefin foams (polyethylene and polypropylene) are widely used in packaging. These thermoplastic foams are generally made with CFC-12.

Many refrigeration applications, e.g., refrigerators and auto air conditioners, presently use CFC-12 as the refrigerant. HFC-134a is a fluorocarbon compound identified as a potential replacement for CFC-12, having properties near those of CFC-12, and being nonflammable with a zero ozone depletion potential. However, HFC-134a has a lower refrigeration coefficient of performance than that of CFC-12, which can result in increased energy consumption for refrigeration applications if HFC-134a is substituted for CFC-12.

Many products designed for household, personal or industrial use are available as aerosol products. Typical examples of such products and ones in which the propellant system of the present invention can be used included personal products such as hair sprays, deodorants and colognes; household products such as waxes, polishes, pan sprays, room fresheners and household insecticides; industrial products such as cleaners, lubricants and mold release agents; and automotive products such as cleaners and polishers. All such products utilize the pressure of a propellant gas or a mixture of propellant gases (i.e., a propellant gas system) to expel the active ingredients from the container. For this purpose, most aerosols employ liquified gases which vaporize and provide the pressure to propel the active ingredients when the valve on the aerosol container is pressed open.

An important physical property associated with the dispensing of aerosol products is the vapor pressure of the propellant. Vapor pressure from the viewpoint of this invention is the pressure exerted when a liquified propellant gas is in equilibrium with its vapor in a closed container, such as an aerosol can. Vapor pressure can be measured by connecting a pressure gauge to the valve on an aerosol can or gas cylinder containing the vapor/liquid mixture. A standard of measurement of vapor pressure in the U.S. aerosol industry is pounds per square inch gauge (psig) with the gas/liquid mixture at constant temperature, most commonly at 70° F. (21° C.). The vapor pressure of liquified gases most widely employed as aerosol propellants will vary over the range of about 20 to 90 psig (138 to 621 kPa) at 70° F. (21° C.). The propellant systems of the present invention have vapor pressures in this range.

In the early 1970s, concern began to be expressed that the stratospheric ozone layer (which provides protection against penetration of the earth's atmosphere by ultraviolet radiation) was being depleted by chlorine atoms introduced to the atmosphere from the release of fully halogenated chlorofluorocarbons. These chlorofluorocarbons are used as propellants in aerosols, as blowing agents for foams, as refrigerants and as cleaning/drying solvent systems. Because of the great chemical stability of fully halogenated chlorofluorocarbons, according to the ozone depletion theory, these compounds do not decompose the earth's atmosphere but reach the stratosphere where they slowly degrade liberating chlorine atoms which in turn react with the ozone.

Concern reached such a level that in 1978 the U.S. Environmental Protection Agency (EPA) placed a ban on nonessential uses of fully halogenated chlorofluorocarbons as aerosol propellants. This ban resulted in a dramatic shift in the U.S. away from chlorofluorocarbon propellants (except for exempted uses) to primarily hydrocarbon propellants. However, since the rest of the world did not join the U.S. in this aerosol ban, the net result has been to shift the uses of chlorofluorocarbons in aerosols out of the U.S., but not to permanently reduce the world-wide total chlorofluorocarbon production, as sought. In fact, in the last few years the total amount of chlorofluorocarbons manufactured worldwide has exceeded the level produced in 1978 (before the U.S. ban).

During the period of 1978-1987, much research was conducted to study the ozone depletion theory. Because of the complexity of atmospheric chemistry, many questions relating to this theory remain unanswered. However, assuming the theory to be valid, the health risks which would result from depletion of the ozone layer are significant. This, coupled with the fact that world-wide production of chlorofluorocarbons has increased, has resulted in international efforts to reduce chlorofluorocarbon use. Particularly, in September, 1987, the United Nations through its Environment Programme (UNEP) issued a tentative proposal calling for a 50 percent reduction in world-wide production of fully halogenated chlorofluorocarbons by the year 1998. This proposal was ratified Jan. 1, 1989 and became effective on Jul. 1, 1989.

Because of this proposed reduction in availability of fully halogenated chlorofluorocarbons such as CFC-11, CFC 12 and CFC-113, alternatively more environmentally acceptable products are urgently needed.

As early as the 1970s with the initial emergence of the ozone depletion theory, it was known that the introduction of hydrogen into previously fully halogenated chlorofluorocarbons markedly reduced the chemical stability of these compounds. Hence, these now destabilized compounds would be expected to degrade in the atmosphere and not reach the stratosphere and the ozone layer. The following Table I lists the ozone depletion potential for a variety of fully and partially halogenated halocarbons. Halocarbon Global Warming Potential data (potential for reflecting infrared radiation (heat) back to earth and thereby raising the earth's surface temperature) are also shown.

TABLE I

Ozone Depletion and Halocarbon Global Warming Potentials

| Blowing Agent | Ozone Depletion Potential | Halocarbon Global Warming Potential |
|---|---|---|
| CFC-11 ($CFCl_3$) | 1.0 | 1.0 |
| CFC-12 ($CF_2Cl_2$) | 1.0 | 2.8 |
| HCFC-22 ($CHF_2Cl$) | 0.05 | 0.3 |
| HCFC-123 ($CF_3CHCl_2$) | 0.02 | 0.02 |
| HCFC-124 ($CF_3CHFCl$) | 0.02 | 0.09 |
| HCFC-134a ($CF_3CH_2F$) | 0 | 0.3 |
| HCFC-141b ($CFCl_2CH_3$) | 0.1 | 0.09 |
| HCFC-142b ($CF_2ClCH_3$) | 0.06 | 0.3 |
| HCFC-152a ($CHF_2CH_3$) | 0 | 0.03 |
| CFC-113 ($CF_2Cl-CFCl_2$) | 0.08–0.9 | 1.4 |

Halocarbons such as HFC-134a hace zero ozone depletion potential. Dimethyl ether, having no halogen content, is also a zero ozone depleter.

Although 1,1,1,2-tetrafluoroethane has utility as a refrigerant, aerosol propellant or foam blowing agent, an azeotrope offers the possibility of producing more economical nonfractionating systems with improved properties such as polymer and refrigerant oil solubility.

Unfortunately, as recognized in the art, it is not possible to predict the formation of azeotropes.

This fact obviously complicates the search for new azeotropes which have application in the field. Nevertheless, there is a constant effort in the art to discover new azeotropic compositions, which have desirable characteristics.

SUMMARY OF THE INVENTION

The present invention is directed to substantially constant boiling compositions consisting essentially of 40–99 weight percent 1,1,1,2-tetrafluoroethane (HFC-134a) and 1–60 weight percent dimethyl ether (DME). Preferred compositions nonflammable at ambient temperature, especially useful as refrigerants, consist essentially of 90–99 weight percent 1,1,1,2-tetrafluoroethane and 1–10 weight percent dimethyl ether. The substantially constant boiling azeotropic composition consists essentially of about 45–55 weight percent 1,1,1,2-tetrafluoroethane and 45–55 weight percent dimethyl ether. The specific azeotropic composition contains 50 weight percent 1,1,1,2-tetrafluoroethane and 50 weight percent dimethyl ether (±5 weight percent) with a boiling temperature of about −23° C. at about atmospheric pressure.

By substantially constant boiling composition as used in the present invention means the initial vapor pressure of the composition at 25° C. does not change by more than 2% after half of the initial mixture has been allowed to evaporate. Thus, the compositions described herein resist component segregation and change in vapor pressure which would seriously diminish their usefulness in the contemplated applications.

In addition, studies have further shown that the novel substantially constant boiling composition of the present invention exhibits dew and bubble point pressures with small pressure differentials of less than about 2%. As is well known in this technology, small differences between the dew point pressure and the bubble point pressure at the same temperature is a further indication of the substantially constant boiling or azeotrope-like behavior of the mixtures.

For the purpose of this discussion, azeotropic or substantially constant boiling is intended to means also essentially azeotropic or essentially constant boiling. In other words, included within the meaning of these terms are not only the true azeotrope described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which not only will exhibit essentially equivalent properties for refrigeration and other applications, but which will also exhibit essentially equivalent properties to the true azeotropic composition in terms of constant boiling characteristics or tendency not to separate or fractionate on boiling The substantially constant boiling compositions of the invention are useful as refrigerants, expansion agents and as aerosol propellants, among other applications. They have zero ozone depletion potential opposite CFC-12, which is rated at 1.0. They are especially suitable as refrigerants in that they exhibit vapor pressures near that of CFC-12, a commercial refrigerant, and have energy efficiency performance better than that of HFC-134a alone.

DESCRIPTION OF PREFERRED EMBODIMENTS

Mixtures of HFC-134a and DME may be formulated such that they are nonflammable. Therefore, also included among the compositions of this invention are compositions nonflammable at ambient temperature containing 1 to 10 weight percent DME and 90 to 99 weight percent HFC-134a that are especially effective refrigerants.

Another aspect of the invention is a refrigeration method which comprises condensing a refrigerant composition of the invention containing 40–99 wt. % HFC-134a and 1–60 wt. % DME and thereafter evaporating it in the vicinity of a body to be cooled. Similarly, still another aspect of the invention is a method for heating which comprises condensing the composition in the presence of a body to be heated and thereafter evaporating the composition.

These azeotropic compositions are useful as propellants for aerosol sprays, e.g., room fresheners. The azeotropes are particularly attractive as they do not separate or fractionate when used in aerosol packages equiped with vapor tap valves wherein the propellant is removed. The invention therefore includes aerosol compositions comprising an active agent and a substantially constant boiling composition of the invention, and processes making such compositions by admixing said ingredients.

The HFC-134a/DME azeotropic and constant boiling azeotrope-like compositions are excellent polymer blowing agents. The dimethyl ether component unexpectedly solubilizes the poorly soluble HFC-134a in polyurethane, phenolic and polystyrene foam, resulting in excellent insulating foams. Once solubilized in the foam, the HFC-134a insulating gas does not diffuse out of the foam.

The novel azeotropic composition of the invention was discovered during a phase study wherein the compositions were varied and vapor pressures measured. The azeotropic composition occurred at the minimum point of the vapor pressure-concentration plot, being at 50 weight percent HFC-134a and 50 weight percent DME at 22° C. ($\pm 5$ weight percent). The azeotrope has an atmospheric pressure boiling point of about $-23°$ C., compared with $-26.5°$ C. for HFC-134a and $-24.6°$ C. for DME.

The language "an azeotrope composition consisting essentially of..." is intended to include mixtures which contain all the components of the azeotrope of this invention (in any amounts) and which, when fractionally distilled, would produce an azeotrope containing all the components of this invention in at least one fraction, alone or in combination with another compound, e.g., one which distills at substantially the same temperature as said fraction.

The nonflammable mixtures of this invention (at ambient temperature) consist essentially of effective amounts of HFC-134a and DME within the range of about 90 to 99 weight percent of HFC-134a and 1 to 10 weight percent of DME. Usually, for purposes of the invention, the mixtures will contain from about 40 to 99 weight percent of HFC-134a, the remainder being DME.

The compositions of this invention have vapor pressures and refrigeration energy efficiency values near that of CFC-12, hence are useful as refrigerants in refrigeration processes. They also show zero ozone depletion potential and the amount of dimethyl ether can be chosen such that the composition is nonflammable.

By vapor pressure substantially equal to the vapor pressure of dichloro-difluoromethane (CFC-12) is meant a vapor pressure which is within 25% of the vapor pressure of CFC-12 at the same temperature. The vapor pressure of CFC-12 is described in the "Handbook of Chemistry and Physics", 50th Edition, pg. D-163.

The binary refrigeration compositions of the invention can be used in existing refrigeration equipment, e.g., designed to use CFC-12. They are useful in compression cycle applications including air conditioner and heat pump systems for producing both cooling and heating. The new refrigerant mixtures can be used in refrigeration applications such as described in U.S. Pat. No. 4,482,465 to Gray.

As stated above, the preferred binary 1,1,1,2-tetrafluoroethane/DME compositions are essentially nonflammable. By nonflammable is meant a gas mixture which in air will not burn when subjected to a spark igniter as described in "Limits of Flammability of Gases and Vapors", Bulletin 503, H. F. Coward et al., Washington, U.S. Bureau of Mines, 1952.

The HFC-134a/dimethyl ether azeotrope of the invention has a vapor pressure at 70° F. (21° C.) of about 58 psig (400 kPa). This pressure range makes the azeotrope attractive and useful as an aerosol propellant.

The HFC-134a/dimethyl ether azeotrope has been determined to be a good solvent for polystyrene. Thus, the azeotrope and, more particularly, the nonflammable mixtures of HFC-134a and dimethyl ether are excellent blowing agents for polystyrene and will make it possible to solubilize HFC-134a in polystyrene.

Additionally, the HFC-134a/dimethyl ether azeotrope is soluble in polyurethane polyols; whereas, HFC-134a alone has quite poor solubility.

The composition of the instant invention can be prepared by any convenient method including mixing or combining, by suitable methods, the desired amounts of the components, using techniques well-known to the art.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following Examples, all temperatures are set forth uncorrected in degrees Celsius and unless otherwise indicated, all parts and percentages are by weight.

The entire disclosure of all applications, patents and publications, cited above and below, are hereby incorporated by reference.

EXAMPLE 1

A phase study is made on 1,1,1,2-tetrafluoroethane and dimethyl ether wherein the composition is varied and the vapor pressures measured at a temperature of 22° C. An azeotropic composition is obtained as evidenced by the minimum vapor pressure observed and is identified as 50 weight percent 1,1,1,2-tetrafluoroethane and 50 weight percent dimethyl ether ($\pm 5$ weight percent).

EXAMPLE 2

Phase studies were made on the substantially constant boiling compositions of 1,1,1,2-tetrafluoroethane (HFC-134a) and dimethyl ether (DME) to verify minimal fractionation and change in vapor pressure during a vapor phase loss of 50% of the compositions at 25° C., about room temperature. Initial liquid composition (IQ), final liquid composition (FQ), initial vapor pressure, and change in vapor pressure from initial vapor pressure were all studied to determine the effects of vapor pressure as illustrated in Table II.

TABLE II

| Sample | Percent Loss of Mixture | Wt. % Composition HFC-134a | DME | Vapor Pressure (psia) | Vapor Pressure Change (%) |
|---|---|---|---|---|---|
| IQ | 0 | 99 | 1 | 97.4 | 0.2 |
| FQ | 50 | 98.7 | 1.3 | 97.2 | |
| IQ | 0 | 95 | 5 | 94.4 | 0.8 |
| FQ | 50 | 93.7 | 6.3 | 93.6 | |
| IQ | 0 | 90 | 10 | 91.3 | 1.2 |
| FQ | 50 | 87.8 | 12.2 | 90.1 | |
| IQ | 0 | 80 | 20 | 86.7 | 1.0 |
| FQ | 50 | 77.3 | 22.7 | 85.8 | |

TABLE II-continued

| Sample | Percent Loss of Mixture | Wt. % Composition HFC-134a | Wt. % Composition DME | Vapor Pressure (psia) | Vapor Pressure Change (%) |
|---|---|---|---|---|---|
| IQ | 0 | 70 | 30 | 84.1 | 0.5 |
| FQ | 50 | 67.7 | 32.3 | 83.7 | |
| IQ | 0 | 60 | 40 | 82.7 | 0.0 |
| FQ | 50 | 58.7 | 41.3 | 82.7 | |
| IQ | 0 | 50 | 50 | 82.4 | 0.0 |
| FQ | 50 | 49.9 | 50.1 | 82.4 | |
| IQ | 0 | 40 | 60 | 82.6 | 0.1 |
| FQ | 50 | 41.0 | 59 | 82.5 | |

The data in Table II indicate that the mixtures of HFC-134a and DME are substantially constant boiling with only a maximum change of 1.2% in the vapor pressure at 25° C. with 50% of the initial mixture evaporated.

EXAMPLE 3

The difference between the dew point and the bubble point pressures of the compositions of the present invention are very small when compared with known nonazeotropic compositions, namely (50+50) weight percent mixtures of pentafluoroethane (HFC-125) and 1,1,1,2-tetrafluoroethane (HFC-134a) and chlorodifluoromethane (HCFC-22) and 1-chloro-1,1-difluoroethane (HCFC-142b), respectively. The following data in Table III confirm the constant boiling behavior of the compositions described herein.

TABLE III

| Refrigerant Composition (Weight Percent) | | | Pressures (psia) at 0° C. | | |
|---|---|---|---|---|---|
| HFC-134a | + | DME | Bubble Point Pressure | Dew Point Pressure | DP* (psia) |
| 100 | | 0 | 43.04 | 43.04 | 0 |
| 99 | | 1 | 42.69 | 42.48 | 0.21 |
| 95 | | 5 | 41.37 | 40.73 | 0.64 |
| 90 | | 10 | 39.99 | 39.26 | 0.73 |
| 80 | | 20 | 38.06 | 37.61 | 0.45 |
| 70 | | 30 | 36.99 | 36.84 | 0.15 |
| 60 | | 40 | 36.55 | 36.54 | 0.01 |
| 50 | | 50 | 36.53 | 36.52 | 0.01 |
| 40 | | 60 | 36.77 | 36.70 | 0.07 |
| HFC-125 (50 + 50) | + | HFC-134a | 68.7 | 58.3 | 10.4 |
| HCFC-22 (50 + 50) | + | HFC-142b | 44.1 | 31.2 | 12.9 |

*DP is difference in pressure between the dew point and bubble point pressures.

The small difference in pressure between the dew point pressure and the bubble point pressure at 0° C. for the mixture of HFC-134a and DME indicates that the compositions have insignificant fractionation and behave as a single compound with a substantially constant boiling point.

EXAMPLE 4

An evaluation of the refrigeration properties of the mixtures of the invention versus dichlorodifluoromethane (CFC-12) and 1,1,1,2-tetrafluoroethane (HFC-134a), respectively, are shown in Table IV. The data are generated on a one ton basis, that is to say, on the removal of heat from a space at the rate of 12,000 Btu/hr (12.66×10⁶ J/hr). The data are based on the ideal refrigeration cycle.

TABLE IV

| Comparison of Refrigeration Performances | | | Weight Percentages | |
|---|---|---|---|---|
| | CFC-12 | HFC-134a | 46% HFC-134a 54% DME | 90% HFC-134a 10% DME |
| Evaporator Temp., °F. (°C.) | 35.0 (1.67) | 35.0 (1.67) | 35.0 (1.67) | 35.0 (1.67) |
| Evaporator Press., psia (kPa) | 47.2 (325) | 45.1 (311) | 39.7 (274) | 42.3 (292) |
| Condenser Temp., °F. (°C.) | 150.0 (65.6) | 150.0 (65.6) | 150.0 (65.6) | 150.0 (65.6) |
| Condenser Press., psia (kPa) | 249.5 (1717) | 274.9 (1895) | 239.6 (1652) | 261.4 (1802) |
| Superheat, °F. with Vapor Liq. Heat Exchange (°C.) | 30.0 (−1.1) | 30.0 (−1.1) | 30.0 (−1.1) | 30.0 (−1.1) |
| Coefficient of Performance | 2.96 | 2.81 | 3.12 | 2.91 |
| Compressor Displacement Ft³/min/ton | 4.44 | 4.55 | 4.56 | 4.61 |

Coefficient of Performance (COP) is a measure of refrigerant energy efficiency.

For a refrigeration cycle typified by the above conditions, the COP of the 46/54 weight percent HFC-134a/DME composition represents a somewhat better performance than both dichlorodifluoromethane (CFC-12), the industry refrigerant standard and HFC-134a (1,1,1,2-tetrafluoroethane) alone. This azeotropic mixture is flammable.

The 90/10 weight percent HFC-134a/DME mixture has a COP of 2.91, which is near that of CFC-12 and is better than HFC-134a alone.

Additives such as lubricants, corrosion inhibitors, stabilizers, dyes and other appropriate materials may be added to the novel compositions of the invention for a variety of purposes provided they do not have an adverse influence on the composition for their intended applications.

EXAMPLE 5

An aerosol room freshener was prepared with the HFC-134a/dimethyl ether azeotrope. The formulation and vapor pressure are shown in Table V.

TABLE V

| Aerosol Room Freshner Formulation | |
|---|---|
| Ingredient | Wt. % |
| Perfume | 2.0 |
| HFC-134a/Dimethyl ether (46/54) | 98.0 |
| Vapor Pressure | |
| at 70° F., psig | 60.5 |
| (at 21° C., kPa) | (417) |

EXAMPLE 6

The solubility of the HFC-134a/dimethyl ether azeotrope is determined in a polyurethane polyol. The azeotrope is readily soluble at 30.0 weight percent; whereas, HFC-134a is insoluble. The solubility data are summarized in Table VI.

TABLE VI

Solubility of HFC-134a/Dimethyl Ether Azeotrope in Polyol

| Blowing Agent | Wt. % in Polyol* | Appearance |
|---|---|---|
| HFC-134a | 30.0 | Insoluble, two phases |
| HFC-134a/Dimethyl ether (46/54) | 30.0 | Soluble, single phase |

*Stepanol ® PS-2852 (Stepan Company) an aromatic polyester polyol.

EXAMPLE 7

The solubility of the HFC-134a/dimethyl ether azeotrope in polystyrene is determined by combining a piece of polystyrene (about 2.5 cm long, 0.5 cm wide and 0.5 cm thick) with about 50 g azeotrope. Whereas HFC-134a has essentially no solvency in polystyrene, the HFC-134a/dimethyl ether azeotrope softens and deforms the polystyrene. The data are summarized in Table VII.

TABLE VII

Solubility of HFC-134a/Dimethyl Ether Azeotrope in Polystyrene

| Blowing Agent | Appearance of Polystyrene |
|---|---|
| HFC-134a | No effect |
| HFC-134a/Dimethyl Ether (46/54) | Polystyrene softened and deformed* |

*On removing the polystyrene from the azeotrope, expansion occurs from solubilized HFC-134a.

EXAMPLE 8

The quantity of HFC-134a required in the vapor space above blends of HFC-134a and dimethyl ether for nonflammability is determined. The test conditions and results are summarized in Table VIII.

TABLE VIII

Nonflammable Blend of HFC-134a/Dimethyl Ether
Ignition Source: 3-mil copper exploding wire (110 volts)

| | Temperature | |
|---|---|---|
| | 80° C. | 150° C. |
| Quantity of HFC-134a required for nonflammability* | greater than 91. % | greater than 98. % |

*In HFC-134a/dimethyl ether vapor mixtures in air

Data in Table VIII indicate an effect of test temperature on the amount of HFC-134a required for nonflammability. This indicates that a concentration of dimethyl ether higher than 9% could be present in a nonflammable composition at ambient temperature (about 25° C.).

The preceding Examples can be repeated with similar success by substituting the generically or specifically described reactants and/or operating conditions of this invention for those used in the preceding Examples.

From the foregoing description, one skilled in the art can easily ascertain the essential characteristics, spirit and scope thereof, can make various changes and modifications of the invention to adapt it to various usages and conditions.

We claim:

1. A substantially constant boiling composition consisting essentially of about 45–55 weight percent 1,1,1,2-tetrafluoroethane and about 45–55 weight percent dimethyl ether, said composition having a boiling point of about −23° C. at about atmospheric pressure.

2. The substantially constant boiling composition of claim 1 consisting essentially of 50 weight percent 1,1,1,2-tetrafluoroethane and 50 weight percent dimethyl ether.

3. A refrigerant composition consisting essentially of the composition of claim 1 and an effective amount of at least one of a stabilizer, anti-corrosive agent, dye or lubricant.

4. A process for producing refrigeration comprising condensing the composition of claim 3 and thereafter evaporating the composition in the presence of a body to be cooled.

5. A process for producing heat comprising condensing the composition of claim 3 in the presence of a body to be heated and thereafter evaporating the composition.

* * * * *